United States Patent
Reeves et al.

(10) Patent No.: US 9,560,518 B1
(45) Date of Patent: Jan. 31, 2017

(54) DATA USAGE ASSESSMENT WHEN ALLOCATING ROAMING RESOURCES

(71) Applicant: Sprint Communications Company L.P., Overland Park, KS (US)

(72) Inventors: Raymond Emilio Reeves, Oviedo, FL (US); Mark Douglas Peden, Olathe, KS (US); Simon Youngs, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 281 days.

(21) Appl. No.: 13/866,528

(22) Filed: Apr. 19, 2013

(51) Int. Cl.
*H04W 4/26* (2009.01)
*H04W 8/18* (2009.01)

(52) U.S. Cl.
CPC ..................... *H04W 8/18* (2013.01)

(58) Field of Classification Search
CPC .................. H04W 4/24; H04W 4/26
USPC ... 455/432.1, 432.2, 435.1, 450, 452.1, 453; 370/331, 332, 328
See application file for complete search history.

(56) References Cited

U.S. PATENT DOCUMENTS

| | | | |
|---|---|---|---|
| 6,542,593 B1 | 4/2003 | Bowman-Amuah | |
| 7,024,199 B1* | 4/2006 | Massie | H04L 12/5692 370/351 |
| 2004/0018829 A1* | 1/2004 | Raman | G06Q 20/28 455/406 |
| 2006/0268793 A1* | 11/2006 | Zanaty | H04L 45/302 370/338 |
| 2008/0070550 A1 | 3/2008 | Hose | |
| 2012/0284390 A1* | 11/2012 | Chokkalingam et al. | 709/224 |
| 2012/0290723 A1* | 11/2012 | Manikowski | G06F 9/505 709/224 |

* cited by examiner

*Primary Examiner* — Kamran Afshar
*Assistant Examiner* — Farideh Madani (57) ABSTRACT

A method, system, and apparatus are described for facilitating data roaming. The system is configured to monitor data usage by a mobile device associated with a first communication network when roaming on a second communication network. The system is further configured to receive a request initiated by the second communication network to allocate a roaming resource to the mobile device. The system is further configured to assess at least a portion of the data usage to determine whether or not to grant the request for a roaming resource. The system is further configured to, in response to a determination to grant the request, communicate a reply indicative of the determination.

17 Claims, 7 Drawing Sheets

DATA USAGE ASSESSMENT WHEN ALLOCATING ROAMING RESOURCES

TECHNICAL BACKGROUND

Wireless roaming situations occur when a mobile communication device, such as a mobile phone, tablet computer, or the like, roams away from its home communication network. Roaming allows a subscriber to obtain services from other networks in the absence of support from their home communication network. For example, a mobile device associated with a subscriber may exchange voice, video, or data using the resources of a roaming network when resources associated with their home network are not available.

From the perspective of subscribers to a wireless communication service, roaming increases the convenience and availability of the service. However, from the perspective of a service provider, roaming by subscribers may incur additional costs that would not otherwise be incurred when subscribers remain on their home networks. For example, a service provider may be obligated to remunerate other service providers when subscribers roam on their networks.

In one particular situation, charges are incurred each time a particular resource on a roaming network is allocated for use on behalf of a roaming subscriber. If normal data usage commences with respect to the resource, then such a situation is tenable as at least some of the incurred charges can be recouped. However, it has become increasingly common that abnormal data usage commences with respect to a resource. This may limit the ability of a service provider to recoup the associated roaming charges incurred when the resource is allocated.

Overview

A method to facilitate data roaming is disclosed. The method comprises monitoring data usage by a mobile device associated with a first communication network when roaming on at least a second communication network. The method further comprises receiving a request initiated by the second communication network to allocate a roaming resource to the mobile device. The method further comprises assessing at least a portion of the data usage to determine whether or not to grant the request for a roaming resource. The method further comprises, in response to a determination to grant the request, communicating a reply indicative of the response.

A roaming analysis system for facilitating roaming comprises a monitoring system and a data processing system. The monitoring system is configured to monitor data usage by a mobile device associated with a first communication network when roaming on at least a second communication network. The data processing system is configured to receive a request initiated by the second communication network to allocate a roaming resource to the mobile device, assess at least a portion of the data usage to determine whether or not to grant the request, and in response to a determination to grant the request, communicate a reply indicative of the determination.

An apparatus to facilitate data roaming comprises program instructions and at least one non-transitory computer readable storage media storing the program instructions. The program instructions, when executed by a processing system, direct the processing system to monitor data usage by a mobile device associated with a first communication network when roaming on at least a second communication network. The program instructions also direct the processing system, in response to a request for an Internet protocol address provided by the second communication network, asses at least a portion of the data usage to determine whether or not to grant the request. The program instructions also direct the processing system, in response to a determination to grant the request, initiate a reply indicative of the determination.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Implementations disclosed herein provide for allocating roaming resources based on data usage associated with a requesting entity. Data usage associated with a mobile device may be monitored over time such that, when a request for a roaming resource is made with respect to the mobile device, the decision to grant or deny the request may be made based at least in part on the monitored data usage. In this manner, situations may be limited, avoided, or otherwise reduced that result in the allocation of roaming resources coincident with little to no data usage.

In an operational example, when either communicating with a home or roaming communication network, an application on a mobile device may request a resource. This may be a resource that the application needs when operating normally. In some situations, there may also be an anomaly in the application that causes the application to request a resource when one is not imminently needed. When the application needs the resource, normal data usage may commence once the resource has been allocated. An example of this is when a user operating a mobile device sends an email message to someone. The user opens the email application on the mobile device and chooses an email to respond to, for example. The user enters their response and sends the message. The resource may be allocated when the mobile device user opens the email application, sends the message, or at some other time throughout this process. The information in the email is transmitted to another email subscriber thereby having some data usage for the resource requested. Another example is obtaining driving directions based on the current location of the mobile device user, web browsing, watching video, or the like.

When there are anomalies in applications on mobile devices, a resource may be requested when one is not imminently needed. The anomalies may be due to poor programming practices, intentional reasons such as viruses or backdoors, or other issues. When a resource is requested when it is not imminently needed, relatively little or no data usage may be communicated. When a requested resource has no data transferred, it is referred to as a 0-byte data session. An example may be a sports news application which always ensures it has an Internet protocol (IP) address "just in case" the user opens the application and wants the read the sports news. The programmer may think the application will respond faster if an IP address is always allocated rather than waiting for the communication network to assign an IP address. The communication network may de-allocate the IP address if the application does not utilize it within a period of time so the application continually requests an IP address to ensure it always had one available. The service provider may incur a charge for the resource allocated yet not be able to recoup this charge as there was relatively little or no data usage. The service provider does not create all of the applications that are used on the phones. The service provider may provide some applications that relate to their business but providing all applications or vetting out all issues in all applications may be too daunting of a task.

To remedy this situation, the service provider may deny the allocation of a resource for some requests so as to minimize the number of requests associated with relatively little or no data usage. If the service provider were to randomly allocate resources, their subscribers may become dissatisfied by randomly having their communication attempts fail. This may cause the subscriber to cancel their subscription to the service provider and choose another service provider. The service provider may intelligently deny the allocation of resources in order to keep their subscribers satisfied while minimizing the number of requests for resources which are underutilized. The discussion below illustrates some examples of how this works.

Figure 1A:
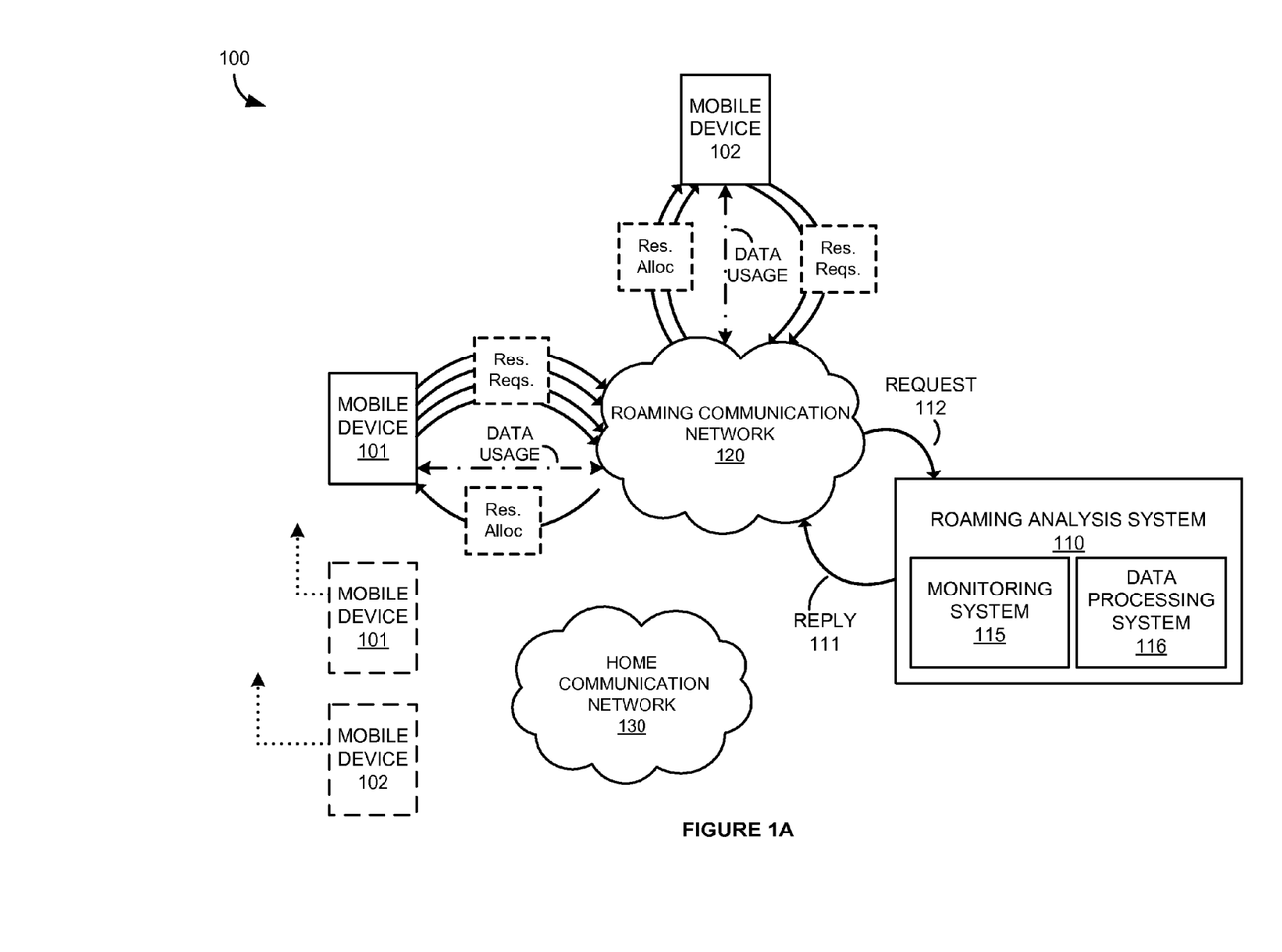
FIG. 1A is a block diagram that illustrates a communication system and associated operations in an exemplary embodiment.

Referring now to the drawings, FIG. 1A is a block diagram that illustrates communication system 100 in one operational embodiment, wherein resources are allocated intelligently based on data usage. Communication system 100 includes mobile device 101, mobile device 102, roaming communication network 120, home communication network 130, and roaming analysis system 110. Roaming analysis system 110 includes monitoring system 115 and data processing system 116. Mobile device 101 and mobile device 102 comprise any device having wireless communication connectivity with hardware and circuitry programmed to function as a telecommunications device.

Communication networks 120 and 130 comprise the core network and the radio access network (RAN) of a wireless communication service provider, and could include base station, RAN controller, radio links, routers, gateways, telecommunication switches, servers, processing systems, or other communication equipment and systems for providing communication and data services. Roaming analysis system 110 comprises a processing system, storage, software, and communication interface.

The following is an operational discussion of FIG. 1A, which is a representation of just some operations of communication system 100. Other operations are possible and may be considered within the scope of the present disclosure. In this example, home communications network 130 is the home network of mobile device 101 and mobile device 102. Initially, mobile device 101 communicates on home communication network 130, as shown by a dashed line in the lower left of FIG. 1A. The user of mobile device 101 travels to a location where home communication network 130 does not provide resources for voice and data. This will require mobile device 101 to now utilize roaming communication network 120 for voice and data service. Upon the need for a roaming resource, mobile device 101 requests this resource from roaming communication network 120. An example of a roaming resource is an internet protocol (IP) address to perform data communications. In another example, the resource required by the mobile device 101 could comprise an authentication key to provide for secure communications.

Figure 2:
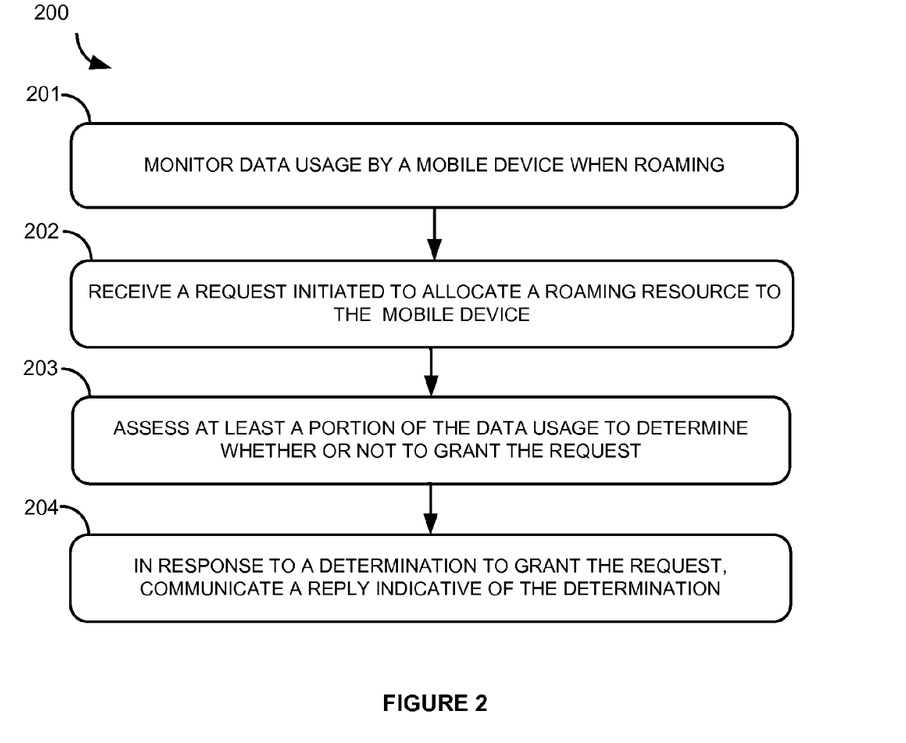
FIG. 2 is a flow diagram that illustrates a roaming analysis process in an exemplary embodiment.

Roaming communication system 120 communicates request 112 to roaming analysis system 110 to determine whether or not to grant the resource request. Roaming analysis system 110 communicates reply 111 to roaming communication system 120 which is indicative of the determination of whether or not to grant the request. FIG. 2 is a flow diagram that illustrates the operation of roaming analysis system 110, when determining whether or not to grant the request. The steps of the operation are indicated below parenthetically.

Roaming analysis system 110 monitors the data usage by mobile device 101 associated with home communication system 130 when roaming on at least a roaming communication network 120 (201). Data usage for mobile device 101 could include monitoring data usage over prior requests or for a specified period of time. By monitoring the data usage, roaming analysis system 110 can determine if mobile device 101 typically has nominal data usage or if most requests for resources result in relatively little or no data usage. The monitoring of data usage can be real-time or historical usage may be used.

Roaming analysis system 110 receives a request initiated by the roaming communication network 120 to allocate a roaming resource to mobile device 101 (202). As shown in FIG. 1A, mobile device 101 makes four requests for resources from roaming communication network 120. These four requests may be from the same or different applications on mobile device 101. These four requests may occur in quick succession or occur over a fairly short period of time. These four requests 112 are sent to roaming analysis system 110. Only one request 112 is shown for clarity but it contains all six requests for mobile device 101 and mobile device 102.

Roaming analysis system 110 assesses at least a portion of the data usage to determine whether or not to grant the request for a resource (203). Whether a resource is allocated is determined based on data usage and potentially other factors, as discussed below. For example, the data usage assessed could be only from the most previous resource request, the most recent two resource requests, or any number of most recent requests. These are just some examples of how many past requests over which the data usage is assessed and other numbers of past requests are possible and may be considered within the scope of the present disclosure. As an example, if the previous resource request resulted in a nominal data usage, it is more likely that the current request will be granted. On the other hand, if the 10 most recent requests all had 0-byte data sessions, the current request may likely be denied. Data usage could also be based on time rather than based on previous requests. These are just some examples of how data usage is tracked and other methods of tracking data usage are possible and may be considered within the scope of the present disclosure.

Roaming analysis system 110, in response to the determination to grant the request, communicates a reply indicative of a determination (204). For example, if roaming analysis system 110 determines the request should be granted, a reply to roaming communication network 120 will be to grant the request. Roaming communication network 120 will then allocate the requested resource to mobile device 101. Mobile device 101 will then utilize the resource. For example, mobile device may utilize the IP address resource received by communicate with another IP address. If roaming analysis system 110 determines the request should be denied, a reply to deny the request will be communicated and no resource will be allocated. As shown in FIG. 1A, mobile device 101 requests four resources from roaming communication network 120. Roaming analysis system 110 determined that only one of the requests should be granted so only one resource was allocated by roaming communication system 120. Granting one request for resource based on the receipt of four requests merely represents a possible ratio of granted request per requests received and other ratios may be considered within the scope of the present disclosure. One granted request may be based on requests received in the tens, hundreds, thousands, or more.

All mobile devices on roaming communication network 120 will be assessed independently on whether resources will be allocated. The discussion now proceeds to mobile device 102, to distinguish it from the operation of mobile device 101. Initially, mobile device 102 communicates on home communication network 130, as shown by a dashed line in the lower left of FIG. 1A. The user of mobile device 102 travels to a location where home communication network 130 does not provide resources for voice and data. This will require mobile device 102 to now utilize roaming communication network 120 for voice and data service. Upon the need for a roaming resource, mobile device 102 requests this resource from roaming communication network 120. An example of a roaming resource is an internet protocol (IP) address to perform data communications.

Roaming analysis system 110 monitors the data usage by mobile device 102 associated with home communication system 130 when roaming on at least a roaming communication network 120 (201). As discussed above, roaming analysis system 110 monitors the data usage of mobile device 102 independent of the data usage of mobile device 101. This data usage could be based on recent requests, time, or other methods as discussed above and in more detail below. Data usage for mobile device 102 could include monitoring data usage over prior requests or for a specified period of time. By monitoring the data usage, roaming analysis system 110 can determine if mobile device 102 typically has nominal data usage or if most requests for resources result in relatively little or no data usage. The monitoring of data usage can be real-time or historical usage may be used.

Roaming analysis system 110 receives a request initiated by the roaming communication network 120 to allocate a roaming resource to mobile device 102 (202). As shown in FIG. 1A, in this instance, mobile device 102 requests two resources from roaming communication network 120. These two requests 112 are sent to roaming analysis system 110. Only one request 112 is shown for clarity but it contains all six requests for mobile device 101 and mobile device 102.

Roaming analysis system 110 assesses at least a portion of the data usage to determine whether or not to grant the request for a resource (203). Whether a resource is allocated is determined based on data usage and potentially other factors, as discussed below.

Roaming analysis system 110, in response to the determination to grant the request, communicates a reply indicative of a determination (204). As shown in FIG. 1A, mobile device 102 requests two resources from roaming communication network 120. Roaming analysis system 110 determined that both requests should be granted so resources were allocated for both requests by roaming communication system 120.

In the example in FIG. 1A, mobile device 101 was not allocated roaming resources for all requests communicated. This may have been due to having relatively little or no data usage or other factors could have been taken into account. In contrast, mobile device 102 was allocated resources for all requests communicated. Whereas mobile device 101 may have had relatively little or no data usage, mobile device 102 may have had nominal or high data usage.

Figure 1B:
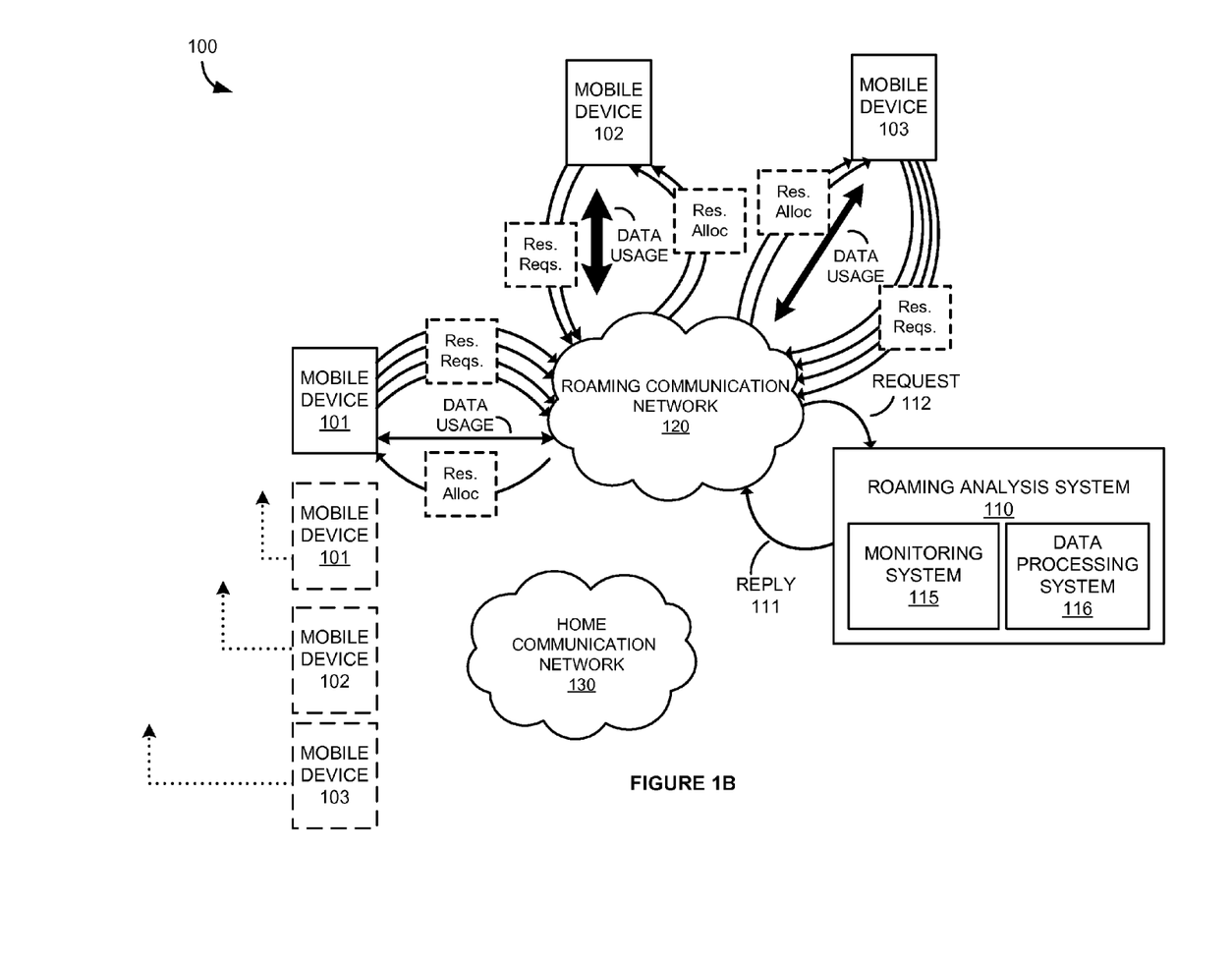
FIG. 1B is a block diagram that illustrates a communication system and associated operations in an exemplary embodiment.

FIG. 1B is a block diagram that illustrates communication system 100 in another operational embodiment. Home communications network 130 is the home network of mobile device 101, mobile device 102, and mobile device 103. Initially, mobile device 101 communicates on home communication network 130, as shown by a dashed line in the lower left of FIG. 1B. The user of mobile device 101 travels to a location where home communication network 130 does not provide resources for voice and data. This will require mobile device 101 to now utilize roaming communication network 120 for voice and data service. Upon the need for a roaming resource, mobile device 101 requests this resource from roaming communication network 120.

Roaming analysis system 110 monitors the data usage by mobile device 101 associated with home communication system 130 when roaming on at least a roaming communication network 120 (201). As can be seen in FIG. 1B, data usage for mobile device 101 is minimal. The reason for the minimal data usage could be that most or all of the requests result in 0-byte data session. Those allocated resources that do not result in 0-byte data session may only communicate a minimal amount of data.

Roaming analysis system 110 receives a request initiated by the roaming communication network 120 to allocate a roaming resource to mobile device 101 (202). As shown in FIG. 1B, mobile device 101 requests four resources from roaming communication network 120. These four requests 112 are sent to roaming analysis system 110. Only one request 112 is shown for clarity but it contains all ten requests for mobile device 101, mobile device 102, and mobile device 103.

Roaming analysis system 110 assesses at least a portion of the data usage for mobile device 101 to determine whether or not to grant the request for a resource (203). Whether a resource is allocated is determined based on data usage and potentially other factors. As can be seen from FIG. 1B, mobile device 101 has relatively little or no data usage.

Roaming analysis system 110, in response to the determination to grant the request, communicates a reply indicative of a determination (204). As shown in FIG. 1B, mobile device 101 requests four resources from roaming communication network 120. Based on the relatively little or no data usage, roaming analysis system 110 determined that only one of the requests should be granted so only one resource was allocated by roaming communication system 120. Most requests will be denied in this situation as most of the requests will result in relatively little or no data usage.

In this example embodiment, mobile device 101 has relatively little or no data usage yet has numerous requests for resources. In this situation, most of those requests for resources are denied while one resource is allocated.

All mobile devices on roaming communication network 120 will be assessed independently on whether resources will be allocated. The discussion now proceeds to mobile device 102, to distinguish it from the operation of mobile device 101. Initially, mobile device 102 communicates on home communication network 130, as shown by a dashed line in the lower left of FIG. 1B. The user of mobile device 102 travels to a location where home communication network 130 does not provide resources for voice and data. This will require mobile device 102 to now utilize roaming communication network 120 for voice and data service. Upon the need for a roaming resource, mobile device 102 requests this resource from roaming communication network 120.

Roaming analysis system 110 monitors the data usage by mobile device 102 associated with home communication system 130 when roaming on at least a roaming communication network 120 (201). As can be seen in FIG. 1B, data usage for mobile device 102 is relatively high. The reason for the relatively high data usage could be that very few or none of the requests result in 0-byte data session.

Roaming analysis system 110 receives a request initiated by the roaming communication network 120 to allocate a roaming resource to mobile device 102 (202). As shown in FIG. 1B, mobile device 102 requests two resources from roaming communication network 120. These two requests 112 are sent to roaming analysis system 110.

Roaming analysis system 110 assesses at least a portion of the data usage for mobile device 101 to determine whether or not to grant the request for a resource (203). Whether a resource is allocated is determined based on data usage and potentially other factors. As can be seen from FIG. 1B, mobile device 102 has relatively high data usage.

Roaming analysis system 110, in response to the determination to grant the request, communicates a reply indicative of a determination (204). As shown in FIG. 1B, mobile device 102 requests two resources from roaming communication network 120. Based on the relatively high data usage, roaming analysis system 110 determined that all requests should be granted so resources for all requests was allocated by roaming communication system 120.

All mobile devices on roaming communication network 120 will be assessed independently on whether resources will be allocated. The discussion now proceeds to mobile device 103, to distinguish it from the operation of mobile device 101 and mobile device 102. Initially, mobile device 103 communicates on home communication network 130, as shown by a dashed line in the lower left of FIG. 1B. The user of mobile device 103 travels to a location where home communication network 130 does not provide resources for voice and data. This will require mobile device 103 to now utilize roaming communication network 120 for voice and data service. Upon the need for a roaming resource, mobile device 103 requests this resource from roaming communication network 120.

Roaming analysis system 110 monitors the data usage by mobile device 103 associated with home communication system 130 when roaming on at least a roaming communication network 120 (201). As can be seen in FIG. 1B, data usage for mobile device 103 is moderate. The reason for the moderate data usage could be that some of the requests result in 0-byte data session while others have nominal data usage.

Roaming analysis system 110 receives a request initiated by the roaming communication network 120 to allocate a roaming resource to mobile device 103 (202). As shown in FIG. 1B, mobile device 103 requests four resources from roaming communication network 120. These four requests 112 are sent to roaming analysis system 110.

Roaming analysis system 110 assesses at least a portion of the data usage for mobile device 103 to determine whether or not to grant the request for a resource (203). Whether a resource is allocated is determined based on data usage and potentially other factors. As can be seen from FIG. 1B, mobile device 103 has moderate data usage.

Roaming analysis system 110, in response to the determination to grant the request, communicates a reply indicative of a determination (204). As shown in FIG. 1B, mobile device 103 requests four resources from roaming communication network 120. Based on the moderate data usage, roaming analysis system 110 determined that two of the four requests should be granted so two resources were allocated by roaming communication system 120. Mobile device 103 has moderate data usage and numerous requests. In this situation, resources will be allocated more often than those allocated for mobile device 101, yet less often than those allocated for mobile device 102.

As can be seen from the example shown in FIG. 1B, different data usage and different quantities of requests for resources results in a varying number of allocated resources. Mobile device 101 had numerous requests for resources yet had minimal data usage, which resulted in relatively few allocated resources. In contrast, mobile device 102 had a moderate number of requests for resource but had a high data usage. This combination culminated in all requests resulting in allocated resources. In between was mobile device 103, which had numerous requests for resources but moderate data usage. This combination allowed for more but not all requests resulting in allocated resources.

Referring again to FIG. 2, a more detail description of the operation of roaming analysis system 110 is discussed. The steps of the operation are indicated below parenthetically.

Roaming analysis system 110 monitors the data usage by a mobile device associated with home communication system 130 when roaming on at least a roaming communication network 120 (201). Monitoring the data usage may include real-time monitoring of data usage but may also include identifying data usage from other sources. Some examples of these sources are databases, home communication network 130, or roaming communication network 120. These are just some examples of other sources of identifying data usage and other sources are possible and may be considered within the scope of the present disclosure. Roaming analysis system 110 could also monitor data usage while not roaming, where resources are being utilized on the home communication network 130. In some examples, data usage could comprise data usage while roaming, data usage on all networks, data usage per resource request on all networks, or data usage per roaming resource request. These are just some examples of data usage and other methods of monitoring data usage are possible and may be considered within the scope of the present disclosure.

Roaming analysis system 110 could also monitor a frequency of past requests to allocate the roaming resource occurring prior to a request. In some examples, the frequency of past requests could occur over every 10 seconds or every 3 hours. These are just some examples of frequencies of past requests and other frequencies are possible and may be considered within the scope of the present disclosure. As an example, if the most recent request was 1 hour ago, this frequency of requests may be considered low and the request for a resource may be granted. On the other hand, if the frequency of past requests was occurring every 1 second, this may be considered excessive and some of these requests may be denied.

Roaming analysis system 110 could also monitor a volume of requests to allocate the roaming resource. For example, only 1 request is received every minute or 100 requests are received every minute. These are just some examples of volume of requests and other volumes and volumes per unit of time are possible and may be considered within the scope of the present disclosure. The volume of requests could be based on any fixed amount of time and this fixed amount of time may be adjusted to adequately utilize the resources. As an example, if the volume of requests was 60 requests per minute, this may be considered excessive and some of these requests may be denied. On the other hand, if the volume of requests is 0 or 1 per 20 minutes, this may be considered normal and the requests received at this rate may be granted.

Roaming analysis system 110 receives a request initiated by the roaming communication network 120 to allocate a roaming resource to mobile device 101 (202). In one example, a roaming resource could comprise an IP address. In other examples, the roaming resource could comprise an authentication key for secure communications or a resource to send an SMS text message.

Roaming analysis system 110 assesses at least a portion of the data usage to determine whether or not to grant the request for a resource (203). For example, the data usage assessed could be only from the most previous resource request, the most recent two resource requests, or any number of most recent requests. These are just some examples of how many past requests over which the data usage is assessed and other numbers of past requests are possible and may be considered within the scope of the present disclosure. As an example, if the previous resource request resulted in a nominal data usage, it is more likely that the current request will be granted. On the other hand, if the 10 most recent requests all had 0-byte data sessions, the current request may most likely be denied.

The data usage could also be assessed based on time, such as the past 60 seconds, 10 minutes, or 1 hour. These are just some examples of over how much time the data usage is assessed and other amounts of time are possible and may be considered within the scope of the present disclosure. As an example, if there was relatively little or no data usage over the past 2 hours, there is a possibility that the current request may have relatively little or no data usage so the request may be denied. If this relatively little or no data usage over the last 2 hours was the result of no requests, the request may be granted. If this relatively little or no data usage over the last 2 hours was due to numerous requests, the current request may likely be denied. On the other hand, if the data usage was nominal over the last 60 seconds, more than likely the data usage may continue to be nominal so the request may likely be granted.

Roaming analysis system 110, in addition to assessing the portion of the data usage, could assess the frequency of past requests to determine whether or not to grant the request. For example, the data usage could be low while the frequency of past requests could be high or the data usage could be high while the frequency of past requests could be low. The combination of data usage and frequency of past requests could be used to determine whether or not to grant the request. When the frequency of requests is high while the data usage is low, the likelihood that the current request will result in relatively little or no data usage will be high. In this instance, the request may most likely be denied. On the other hand, if the frequency of request is low while the data usage is nominal, the likelihood that the current request will result in nominal data usage will be high and the request may most likely be granted.

Roaming analysis system 110, in addition to assessing the portion of the data usage, could assess at least one previous response to at least one previous request to allocate the roaming resource to determine whether or not to grant the request. For example, roaming analysis system 110 could grant one out of two requests. By assessing the previous response, the current response is known. If the previous response was to deny the request, the current request may be granted. Roaming analysis system 110 could grant any number of requests per any number of requests received, such as one request granted out of every ten requests received, two requests granted out of every three requests received, and so on. These are just some examples of how many requests are granted based on how many requests are received and other numbers are possible and may be considered within the scope of the present disclosure. As an example, the roaming analysis system 110 could initially grant one out of two requests. If there was relatively little or no data usage on the granted request, the roaming analysis system 110 could then grant one out of every three requests. If there was still relatively little or no data usage, the roaming analysis system 110 could reduce the number of granted requests until more granted requests resulted in nominal data usage. On the other hand, if the roaming analysis system 110 initially granted one out of two requests and there was nominal data usage on the granted request, the roaming analysis system 110 could then grant every request until more granted requests resulted in relatively little or no data usage. At this point, the roaming analysis system 110 could go through the process again of rejecting some of the requests.

Roaming analysis system 110, in addition to assessing the portion of the data usage, could assess an amount of time elapsed since a previous determination to grant a previous request to allocate the roaming resource to determine whether or not to grant the request. For example, a request could be granted every 60 seconds no matter what the frequency of past requests or a request could be granted every 5 minutes no matter what the frequency of past requests. These are just some examples of how much time has elapsed since the previous granted request and other amounts of time are possible and may be considered within the scope of the present disclosure. The amount of time elapsed could be adjusted to adequately utilize the resources. As an example, if the time elapsed was set to once every 60 seconds, there may be 100 requests in the 60 seconds yet only one of those requests may be granted and the other 99 may be denied. In this way, you are potentially rejecting 99 requests that have relatively little or no data usage. As another example, if the time elapsed was set to once every three minutes and a request occurred every five minutes, all requests may be granted. Roaming analysis system 110 could also communicate a reply indicating roaming communication network 120 may allocate resources after a specific time has elapsed, without having to send a request to roaming analysis system 110. In this case, roaming communication network 120 keeps track of the elapsed time and does not rely on roaming analysis system 110 to track this time. Allowing roaming communication network 120 to track the elapsed time minimizes the number of requests sent to roaming analysis system 110.

Roaming analysis system 110, in addition to assessing the portion of the data usage, could assess the volume of requests to determine whether or not to grant the request. For example, only 1 request is received every minute or 100 requests are received every minute. These are just some examples of volume of requests and other volumes and volumes per unit of time are possible and may be considered within the scope of the present disclosure. The volume of requests could be based on any fixed amount of time and this fixed amount of time may be adjusted to adequately utilize the resources. As an example, if the volume of requests was 60 requests per minute, this may be considered excessive and some of these requests may be denied. In this instance, if most of the requests had nominal data usage, most of the requests could be allowed. On the other hand, if the volume of requests is 0 or 1 per 20 minutes, this may be considered normal and the requests received at this rate may be granted.

Roaming analysis system 110 could also determine if mobile device 101 is problematic based on the data usage and the frequency of past requests and communicate an alert for consumption by a user associated with mobile device 101 in response to determining that the mobile device is problematic. For example, mobile device 101 having a low data usage but a high frequency of past requests could be determined to be problematic. Once mobile device 101 is determined to be problematic, an alert such as an email, text message, or voicemail could be communicated to the user associated with mobile device 101 to alert them of the issue.

Roaming analysis system 110, in response to the determination to grant the request, communicates a reply indicative of a determination (204). For example, if roaming analysis system 110 determines the request should be granted, a reply to roaming communication network 120 will be to grant the request. Roaming communication network 120 will allocate the requested resource to mobile device 101. Mobile device 101 will then utilize the resource by sending an SMS text message, communicating with an IP address utilizing the IP address resource received, or any other utilization of the allocated resource. If roaming analysis system 110 determines the request should be denied, a reply to deny the request will be communicated and no resource will be allocated. Roaming analysis system 110 could also communicate a reply indicating roaming communication network 120 may allocate resources after a specific time has elapsed. In this case, roaming communication network 120 keeps track of the elapsed time and does not rely on roaming analysis system 110 to track this time.

The process of FIG. 2 is repeatedly applied to each new request for resources. As there may be differences over time with a mobile device and mobile devices may utilize resources differently, the results may vary for each attempt and also for each mobile device, as illustrated in FIG. 1B. This allows the system to reduce the wasteful allocation of resources by optimizing how many requests for resources are granted. If one day, mobile device 101 effectively utilizes allocated resources, more requests will be granted. If another day, the same mobile device 101 does not effectively utilize allocated resources, more requests will be denied. Two different mobile devices communicating with the same roaming communication network 120 may be granted different percentage of resource requests based on how effectively they utilize the allocated resources, as illustrated in FIGS. 1A and 1B. As an example, mobile device 101 may only be granted one out of ten requests while mobile device 102 may be granted all requests. Based on changing circumstances, a different time or day may see a different percentage of requests granted for each mobile device. In each case, there is a reduction in the wasteful allocation of resources.

Referring back to FIGS. 1A and 1B, mobile device 101, mobile device 102, and mobile device 103 comprise any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Mobile device 101, mobile device 102, and mobile device 103 may also include a user interface, memory system, software, processing circuitry, or some other communication components. For example, mobile device 101, mobile device 102, and mobile device 103 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by mobile device 101 include Code Division Multiple Access (CDMA) 1×RTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long Term Evolution (3GPP LTE), LTE Advanced, Worldwide Interoperability for Microwave Access (WiMAX), IEEE 802.11 protocols (Wi-Fi), Bluetooth, Internet, telephony, or any other wireless network protocol that facilitates communication between mobile device 101, mobile device 102, and mobile device 103 and communication networks 120 or 130.

Communication networks 120 and 130 comprise the core network of a wireless communication service provider, and could include routers, gateways, telecommunication switches, servers, processing systems, or other communication equipment and systems for providing communication and data services. Communication networks 120 and 130 could comprise wireless communication nodes, telephony switches, Internet routers, network gateways, computer systems, communication links, or some other type of communication equipment—including combinations thereof.

Roaming analysis system 110 comprises a processing system, storage, software, and communication interface. Roaming analysis system 110 may also include other components such a router, server, data storage system, and power supply. Roaming analysis system 110 may reside in a single device or may be distributed across multiple devices. Roaming analysis system 110 is shown externally to home communication system 130, but roaming analysis system 110 could be integrated within home communication system 130 or within other systems—including other systems within communication system 100. In some examples, roaming analysis system 110 could comprise a home agent, packet data serving node (PDSN), network switch, mobile switching center, router, switching system, packet gateway, network gateway system, Internet access node, application server, service node, firewall, or some other communication system—including combinations thereof.

Roaming analysis system 110 comprises monitor system 115 and data processing system 116. In particular, monitoring system 115 may monitor data usage by a mobile device associated with a first communication network when roaming on at least a second communication network. Monitoring system 115 may also monitor a frequency of past requests to allocate a roaming resource occurring prior to a request. Monitoring system 115 may also to monitor a volume of requests to allocate a roaming resource.

Data processing system 116 may receive a request initiated by a second communication network to allocate a roaming resource to a mobile device, assess at least a portion of the data usage to determine whether or not to grant the request, and in response to a determination to grant the request, communicate a reply indicative of the determination. Data processing system 116 may also, in addition to assessing the portion of the data usage, assess the frequency of past requests to determine whether or not to grant a request for a roaming resource. Data processing system 116 may also, in addition to assessing the portion of the data usage, assess at least one previous response to at least one previous request to allocate a roaming resource to determine whether or not to grant a request for a roaming resource. Data processing system 116 may also, in addition to assessing the portion of the data usage, assess an amount of time elapsed since a previous determination to grant a previous request to allocate a roaming resource to determine whether or not to grant a request for a roaming resource. Data processing system 116 may also, in addition to assessing the portion of the data usage, assess the volume of requests to determine whether or not to grant a request for a roaming resource. Data processing system 116 may also determine if a mobile device is problematic based on the data usage and the frequency of past requests and communicate an alert for consumption by a user associated with the mobile device in response to determining that the mobile device is problematic.

Request 111 and reply 112 use metal, air, space, optical fiber such as glass or plastic, or some other material as the transport medium—including combinations thereof. Request 111 and reply 112 could use various communication protocols, such as TDM, IP, Ethernet, telephony, optical networking, hybrid fiber coax (HFC), communication signaling, wireless protocols, or some other communication format—including combinations thereof. Request 111 and reply 112 may each be direct links or could include intermediate networks, systems, or devices.

Figure 3:
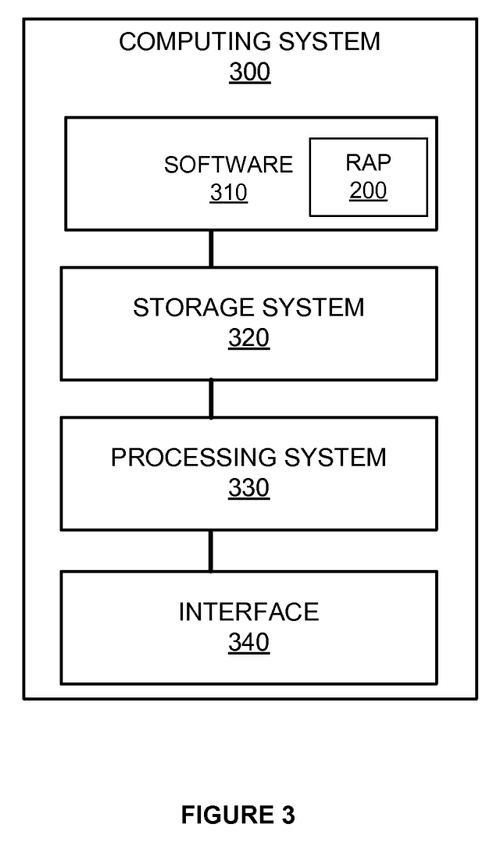
FIG. 3 is a block diagram that illustrates a computing system in an exemplary embodiment.

FIG. 3 is a block diagram that illustrates computing system 300 in an exemplary embodiment. Computing system 300 provides an example of suitable computing system that may be used to implement either or both monitoring system 115 or data processing system 116, although monitoring system 115 and data processing system 116 may have alternative configurations. Computing system 300 comprises software 310, storage 320, processing system 330, and interface 340. Computing system 300 implements roaming analysis process 200 in software 310.

Processing system 330 comprises microprocessor and other circuitry that retrieves and executes software 310 from storage 320. Processing system 330 may comprise a single device or could be distributed across multiple devices—including devices in different geographic areas. Processing system 330 may be embedded in various types of equipment. Processor system 330, when executing software 310, directs computing system 300 to operate as described herein to perform the function of monitoring system 115 and data processing system 116.

Storage 320 comprises a non-transitory computer readable storage medium, such as a disk drive, flash drive, data storage circuitry, or some other hardware memory apparatus. Storage 320 may comprise a single device or could be distributed across multiple devices—including devices in different geographic areas. Storage 320 may be embedded in various types of equipment.

Software 310 comprises computer programs, firmware, or some other form of machine-readable processing instructions. Software 310 may include an operating system, utilities, drivers, network interfaces, applications, or some other type of software. Software 310 could comprise program instructions stored on one or more computer readable storage media for facilitating data roaming that, when executed on a processing system, direct the processing system to facilitate data roaming.

Interface 340 comprises components that communicate over communication links, such as network cards, ports, RF transceivers, processing circuitry and software, or some other communication components. Interface 340 may be configured to communicate over metallic, wireless, or optical links. Interface 340 may be configured to use TDM, IP, Ethernet, optical networking, wireless protocols, communication signaling, or some other communication format—including combinations thereof.

Figure 4:
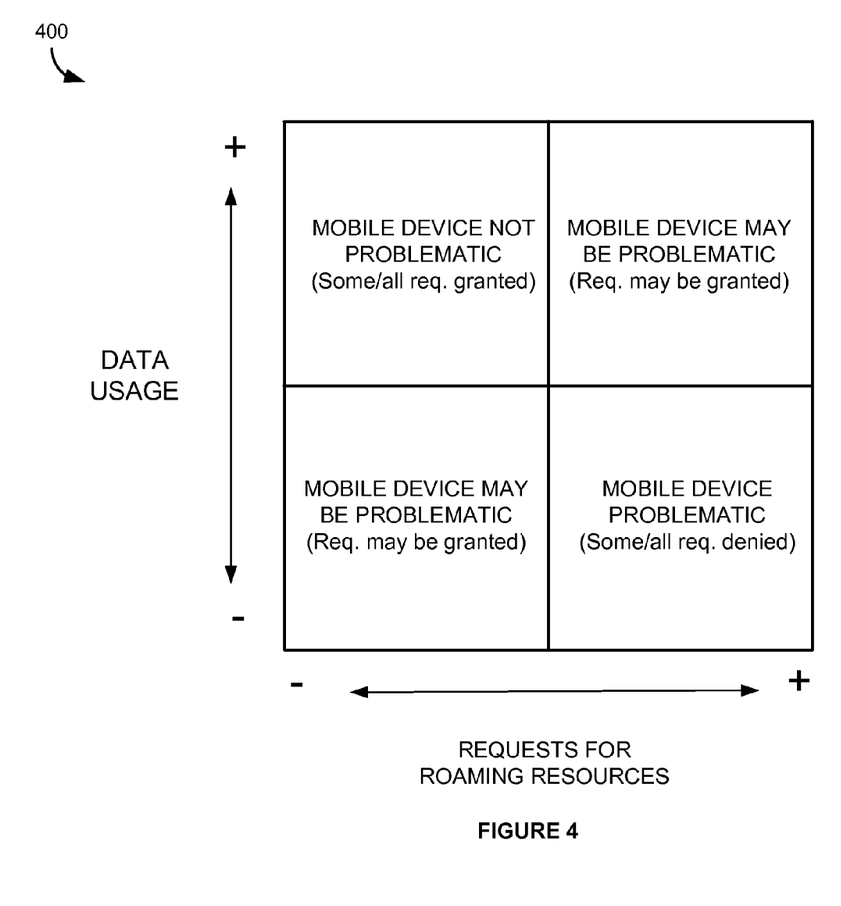
FIG. 4 is a chart that illustrates a guide for providing roaming analysis in an exemplary embodiment.

FIG. 4 is a guide that is representative of a decision matrix that may be followed when deciding whether or not a mobile device is problematic. Guide 400 shows the requests for roaming resources along the x-axis. The values along the y-axis of guide 400 show data usage. Guide 400 in FIG. 4 provides an example of how a mobile device may be determined to be problematic. As data usage varies and as requests for roaming resources varies, whether or not a mobile device is considered problematic may vary in accordance with guide 400. Guide 400 is just an example of how a mobile device is considered to be problematic and other methods of determining how a mobile device is considered to be problematic may be considered within the scope of the present disclosure. In this example in the lower right-hand quadrant, when a mobile device requests a high number of roaming resources while transferring relatively little or no data, this device may be considered problematic and an alert may be sent to the user associated with the mobile device. An example of this is when a mobile device repeatedly requests an IP address yet has 0-byte data sessions for most or all of these requests. In the upper left-hand quadrant, when a mobile device requests a low number of roaming resources while having a high data usage, the device may have minimal 0-byte data sessions so this mobile device may not be considered problematic. The other two quadrants require more analysis to determine if the mobile device is problematic. In the upper right-hand quadrant, a mobile device could have a significant amount of 0-byte data sessions while having a small number of resource requests which have a high data usage. This mobile device could still be considered problematic as when the small number of resource requests which have a high data usage drops yet the number of 0-byte data sessions remains roughly the same. Other factors may be taken into account to determine whether a mobile device is considered to be problematic.

Figure 5:
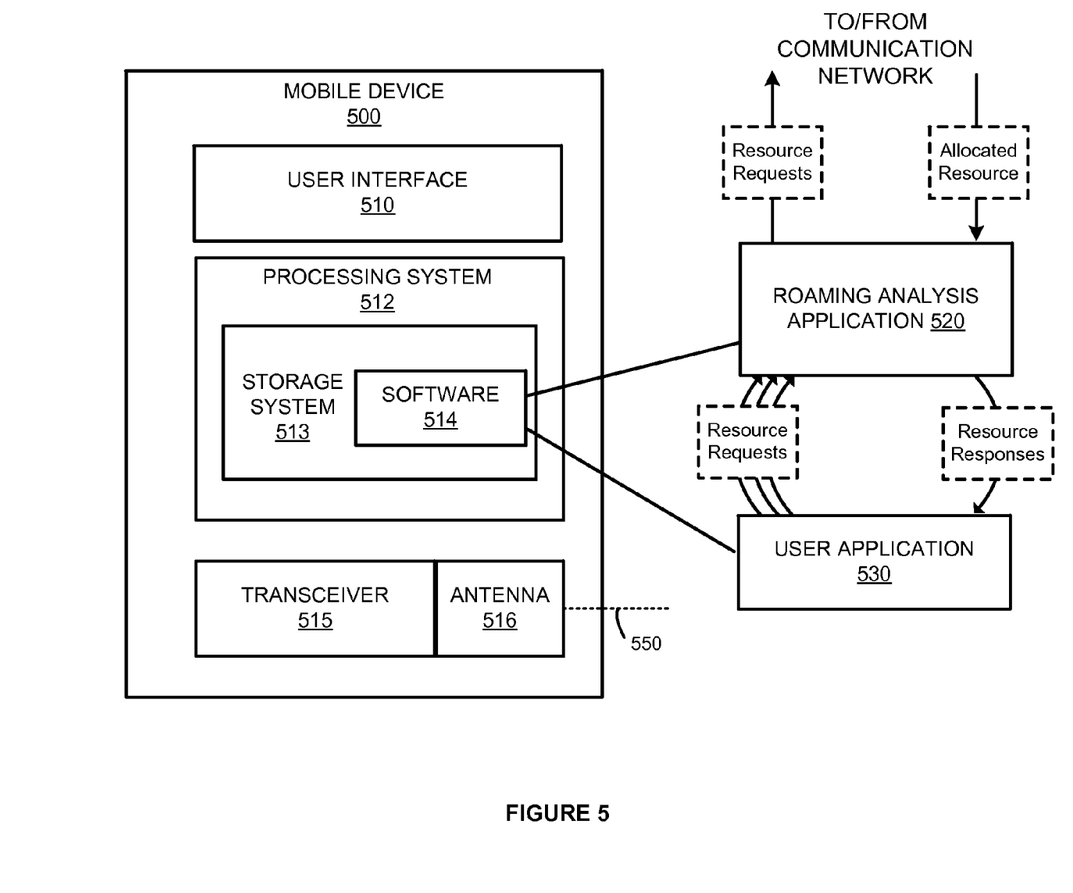
FIG. 5 is a block diagram that illustrates a mobile device and associated operations in an exemplary embodiment.

FIG. 5 is a block diagram illustrating mobile device 500, as an example of mobile device 101, mobile device 102, and mobile device 103, found in FIG. 1, although mobile devices 101 could use other configurations. Mobile device 500 includes user interface 510, processing system 512, storage system 513, software 514, transceiver 515, and antenna 516. Mobile device 500 may be distributed or consolidated among devices that together form elements 510 and 512-516.

Figure 6:
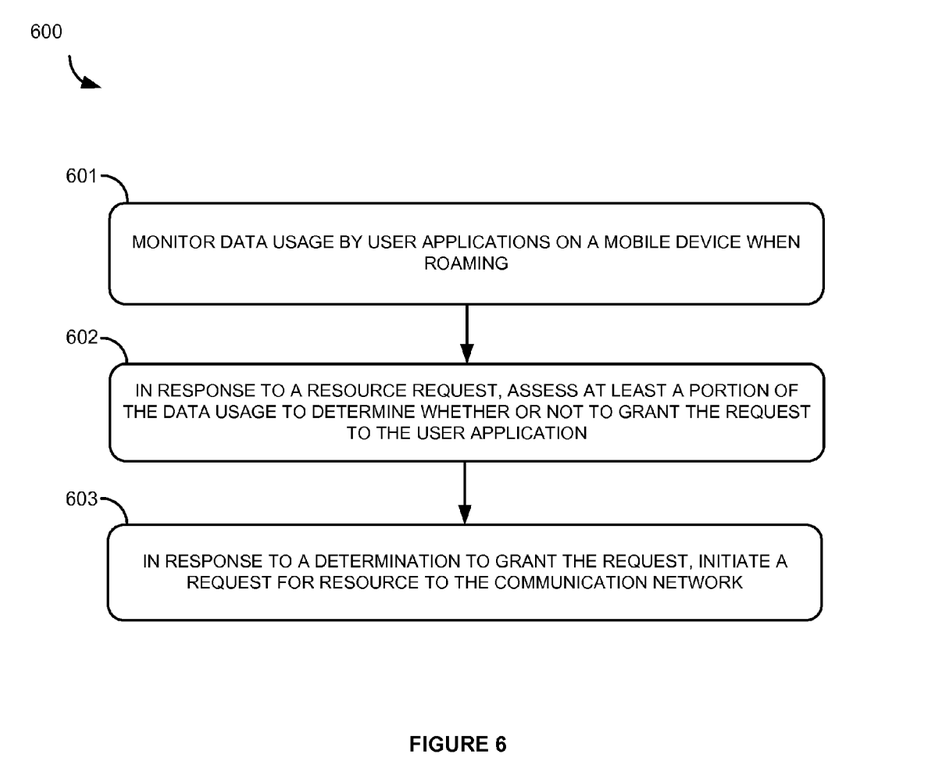
FIG. 6 is a flow diagram that illustrates a roaming analysis process in an exemplary embodiment.

Processing system 512 includes storage system 513. Processing system 512 retrieves and executes software 514 from storage system 513. Processing system 512 could incorporate a computer microprocessor, logic circuit, or some other processing device, and may be distributed among multiple processing devices. Storage system 513 could include computer-readable storage media such as disks, tapes, integrated circuits, servers, or some other memory device, and also may be distributed among multiple memory devices. Software 514 may include an operating system, logs, utilities, drivers, networking software, and other software typically loaded onto a computer system. Software 514 could contain an application program, firmware, or some other form of computer-readable program instructions. Software 514 could contain user application 530 which could request roaming resources. There may be one or more user applications 530 on a mobile device. Software could also contain roaming analysis application 520 which encompasses roaming analysis process 600, as shown in FIG. 6.

When executed by processing system 512, roaming analysis application 520 directs mobile device 500 to operate as described herein, such as monitor data usage associated with a first communication network when roaming on at least a second communication network. Roaming analysis application 520 may monitor data usage for each user application 530 or combine data usage for all user applications that utilize data. Roaming analysis application 520 could also direct mobile device 500, in response to a request for an IP address provided by a second communication network, assess at least a portion of the data usage to determine whether or not to grant the request. Roaming analysis application 520 could also direct mobile device 500, in response to a determination to grant the request, initiate a reply indicative of the determination. As an example, a user application 530 on mobile device 500 requests an IP address. Roaming analysis application 520 could assess at least a portion of the data usage to determine whether or not to grant the request to the user application. If roaming analysis application 520 determines that a request should be granted, a request for roaming resource may be communicated to roaming communication network 120. The resource received from roaming communication network 120 may then be provided to user application 530. If roaming analysis application 520 determines that a request should be denied, roaming analysis application 520 could communicate the denial to user application 530.

User interface 510 includes equipment and circuitry for receiving user input and control. Examples of the equipment and circuitry for receiving user input and control include push buttons, touch screens, selection knobs, dials, switches, actuators, keys, keyboards, pointer devices, microphones, transducers, potentiometers, non-contact sensing circuitry, or other human-interface equipment. User interface 510 also includes equipment to communicate information to a user of mobile device 500. Examples of the equipment to communicate information to the user could include displays, indicator lights, lamps, light-emitting diodes, haptic feedback devices, audible signal transducers, speakers, buzzers, alarms, vibration devices, or other indicator equipment, including combinations thereof.

Transceiver 515 comprises radio frequency (RF) communication circuitry. Transceiver 515 includes antenna 516 in this example. Transceiver 515 could also include amplifiers, filters, modulators, and signal processing circuitry. Transceiver 515 communicates with wireless access systems, such as base stations, omitted for clarity, through antenna 516 over wireless link 550, to access communication services and exchange communications of the communication services, receive control information, such as power change instructions, adjust a power of communication transfer, interrupt transfer of data frames or subframes, and restart transfer of data frames or subframes, among other operations.

Antenna 516 includes an antenna or antenna array, and could include additional circuitry such as impedance matching elements, physical structures, wires, or other elements. Antenna 516 can exchange RF communications with transceiver 515 and may include multiplexing circuitry. Antenna 516 could support wireless communications over multiple frequency spectrums, and could include separate antenna elements for each frequency spectrum, although other configurations could be employed. Antenna 516 allows for communication of mobile device 500 over wireless link 550.

Wireless link 550 could use various protocols or communication formats as described herein for mobile device 101, including combinations, variations, or improvements thereof.

FIG. 6 is a flow diagram that illustrates the operation of mobile device 500 in an exemplary embodiment, when implementing roaming analysis application 520. Mobile device 500 could also be an apparatus performing the operations shown in FIG. 6.

Mobile device 500 monitors data usage by user applications on mobile device 500 when roaming (601). In one example, mobile device 500 could monitor data usage of all user applications utilizing allocated resources while roaming. This allows mobile device 500 to determine if mobile device as a whole has nominal data usage. In another example, mobile device 500 could monitor data usage for each user application 530 utilizing allocated resources while roaming. This allows mobile device 500 to determine which applications have nominal data usage and which have relatively little or no data usage. Mobile device 500 could also monitor these same situations while not roaming. These are just some examples of mobile device 500 monitoring data usage and other methods of monitoring data usage are possible and may be considered within the scope of the present disclosure.

Mobile device 500, in response to a resource request, assesses at least a portion of the data usage to determine whether or not to grant the request. In one example, mobile device 500 could receive a request from user application 530 on mobile device 500 for an IP address. Mobile device could assess the data usage by user application 530 requesting the IP address to determine whether or not to grant the request. Mobile device 500 could also assess the data usage for all user applications on mobile device 500 to determine whether or not to grant the request. These are just some examples of mobile device 500 assessing data usage and other methods of assessing data usage are possible and may be considered within the scope of the present disclosure.

Mobile device 500, in response to a determination to grant the request, initiates a request for resources to roaming communication network 120. In one example, mobile device 500 could determine to not grant the request. The request from the application may be denied and a request for an IP address may not be sent along to roaming communication network 120. In another example, mobile device 500 could determine to grant the request. The request from the application may be granted and a request for an IP address may be sent to roaming communication network 120. Roaming communication network 120 may grant the request and provide an IP address to mobile device 500 which provides the IP address to the requesting user application 530. These are just some examples of mobile device 500 initiating a reply indicative of the determination and other methods of initiating a reply are possible and may be considered within the scope of the present disclosure.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method to facilitate data roaming, the method comprising:
    monitoring data usage by a mobile device associated with a first communication network when roaming on at least a second communication network;
    receiving a request initiated by the second communication network to allocate a roaming resource to the mobile device;
    monitoring a frequency of past requests to allocate roaming resources to the mobile device occurring prior to the request;
    assessing at least a portion of the data usage and the frequency of past requests to determine whether or not to grant the request;
    in response to a determination to grant the request, communicating a reply indicative of the determination;
    determining whether the mobile device is problematic based on the data usage and the frequency of past requests; and
    in response to determining the mobile device is problematic, communicating an alert for consumption by a user associated with the mobile device.

2. The method of claim 1 wherein assessing at least the portion of the data usage and the frequency of past requests to determine whether or not to grant the request comprises assessing at least the portion of data usage in relation to the frequency of past requests to determine whether or not to grant the request.

3. The method of claim 1 further comprising, in addition to assessing the portion of the data usage and the frequency of past requests, assessing at least one previous response to at least one previous request to allocate the roaming resource to determine whether or not to grant the request.

4. The method of claim 1 further comprising, in addition to assessing the portion of the data usage and the frequency of past requests, assessing an amount of time elapsed since a previous determination to grant a previous request to allocate the roaming resource to determine whether or not to grant the request.

5. The method of claim 1 further comprising monitoring a volume of requests to allocate the roaming resource and, in addition to assessing the portion of the data usage and the frequency of past requests, assessing the volume of the requests to determine whether or not to grant the request.

6. The method of claim 1 wherein the roaming resource comprises an Internet protocol (IP) address with which the mobile device exchanges communications on the second communication network.

7. A roaming analysis system for facilitating data roaming comprising:
    a monitoring system configured to monitor data usage by a mobile device associated with a first communication network when roaming on at least a second communication network and monitor a frequency of past requests to allocate roaming resources to the mobile device occurring prior to the request; and
    a data processing system configured to receive a request initiated by the second communication network to allocate a roaming resource to the mobile device, assess at least a portion of the data usage and the frequency of past requests to determine whether or not to grant the request, in response to a determination to grant the request, communicate a reply indicative of the determination, determine whether the mobile device is problematic based on the data usage and the frequency of past requests, and in response to determining the mobile device is problematic, communicate an alert for consumption by a user associated with the mobile device.

8. The roaming analysis system of claim 7 wherein the monitoring system configured to assess at least the portion of the data usage and the frequency of past requests to determine whether or not to grant the request is configured to assess at least the portion of data usage in relation to the frequency of past requests to determine whether or not to grant the request.

9. The roaming analysis system of claim 7 wherein the data processing system is further configured to, in addition to assessing the portion of the data usage and the frequency of past requests, assess at least one previous response to at least one previous request to allocate the roaming resource to determine whether or not to grant the request.

10. The roaming analysis system of claim 7 wherein the data processing system is further configured to, in addition to assessing the portion of the data usage and the frequency of past requests, assess an amount of time elapsed since a previous determination to grant a previous request to allocate the roaming resource to determine whether or not to grant the request.

11. The roaming analysis system of claim 7 wherein the monitoring system is further configured to monitor a volume of requests to allocate the roaming resource and wherein the data processing system is further configured to, in addition to assessing the portion of the data usage and the frequency of past requests, assess the volume of the requests to determine whether or not to grant the request.

12. The roaming analysis system of claim 7 wherein the roaming resource comprises an Internet protocol (IP) address with which the mobile device exchanges communications on the second communication network.

13. An apparatus comprising:
    one or more non-transitory computer readable storage media; and
    program instructions stored on the one or more non-transitory computer readable storage media for facilitating data roaming that, when executed by a processing system, direct the processing system to at least:
    monitor data usage by a mobile device associated with a first communication network when roaming on at least a second communication network;
    monitor a frequency of past requests to allocate roaming resources for the mobile device occurring prior to the request;
    in response to a request for an Internet protocol address for the mobile device provided by the second communication network, assess at least a portion of the data usage and the frequency of past requests to determine whether or not to grant the request;
    in response to a determination to grant the request, initiate a reply indicative of the determination;

determine whether the mobile device is problematic based on the data usage and the frequency of past requests; and in response to determining the mobile device is problematic, communicate an alert for consumption by a user associated with the mobile device.

14. The apparatus of claim 13 further comprising a communication interface configured to receive the request from the second communication network and a processing system configured to execute the program instructions.

15. The apparatus of claim 14 wherein the program instructions to assess at least a portion of the data usage and the frequency of past requests to determine whether or not to grant the request direct the processing system to assess at least the portion of data usage in relation to the frequency of past requests to determine whether or not to grant the request.

16. The apparatus of claim 13 wherein the program instructions further direct the processing system to, in addition to assessing the portion of the data usage and the frequency of past requests, assess at least one previous response to at least one previous request to allocate the roaming resource to determine whether or not to grant the request.

17. The apparatus of claim 13 wherein the program instructions further direct the processing system to, in addition to assessing the portion of the data usage and the frequency of past requests, assess an amount of time elapsed since a previous determination to grant a previous request to allocate the roaming resource to determine whether or not to grant the request.

* * * * *